United States Patent [19]

Bogart

[11] Patent Number: 4,999,103

[45] Date of Patent: Mar. 12, 1991

[54] DECONTAMINATION APPARATUS MOBILE WATER

[76] Inventor: John D. Bogart, 310 Belinda Pkwy., Mt. Juliet, Tenn. 37122

[21] Appl. No.: 411,267

[22] Filed: Sep. 25, 1989

Related U.S. Application Data

[63] Continuation of Ser. No. 131,728, Dec. 11, 1987, abandoned.

[51] Int. Cl.⁵ .............................................. C02F 3/20
[52] U.S. Cl. ................................ 210/151; 210/195.3; 210/199; 210/241
[58] Field of Search ............... 210/615, 626, 150, 151, 210/195.1, 195.3, 199, 201, 220, 241

[56] References Cited

U.S. PATENT DOCUMENTS

| | | | |
|---|---|---|---|
| 3,400,822 | 9/1968 | McKeown | 210/195.3 |
| 4,006,085 | 2/1977 | Matteson | 210/195.3 |
| 4,253,957 | 3/1981 | Sullivan | 210/195.3 |
| 4,351,722 | 9/1982 | Mixon | 210/195.3 |
| 4,525,277 | 6/1985 | Poulin | 210/241 X |

*Primary Examiner*—Tom Wyse
*Attorney, Agent, or Firm*—Fleit, Jacobson, Cohn, Price, Holman & Stern

[57] ABSTRACT

A mobile tank for decontamination of waste or ground water contains multiple cells for biological treatment and clarification of the water. Systems are provided for aerating the treatment cells and for recycling activated bacteria from the clarifier cell to the primary treatment cell.

3 Claims, 2 Drawing Sheets

DECONTAMINATION APPARATUS MOBILE WATER

This application is a continuation of application Ser. No. 07/131,728, filed Dec. 11, 1987, abandoned.

BACKGROUND OF THE INVENTION

The present invention relates to an apparatus for the biological treatment of contaminated waste water and ground water supplies. Specifically, the present apparatus is directed toward the on-site biological treatment of water contaminated by organic chemicals, where such treatment is implemented using mobile water processing apparatus.

The safe handling and disposition of waste and ground water contaminated by toxic organic chemicals is a problem confronting municipalities and industry alike. Increasing federal regulation of the environment has caused governmental and industrial environmental managers to look for effective and economic methods of removing toxic organic contaminants from waste or ground water streams and pools and from stored toxic wastes. Several methods have been employed, most requiring the permanent or semi-permanent installation of expensive processing equipment. However, such installations are not suitable for the treatment of water streams or supplies that may be only incidentally exposed to contaminants, from either temporary manufacturing operations or accidental exposure. Treatment of stored toxic wastes which are not continuously replenished is also a problem for which a permanent treatment facility may be excessively costly.

Biological degradation of hazardous waste by-products through use of specially selected and nutritionally supported bacteria has been highly successful. A description of the fundamentals of such a process, as generally employed by the present invention, is contained in U.S. Pat. No. 4,584,102.

What is needed, then, is an apparatus which is adapted for implementing a biodegradation hazardous waste treatment process, which apparatus can be brought to the site of contamination, placed in operation, and removed with a minimum of time, effort, and expense.

SUMMARY OF THE INVENTION

In the present invention, adaptation of a biological degradation decontamination method to mobile use is accomplished by modifying a mobile oil field fractionation tank. The tank is fabricated with aeration equipment, a bacterial recycling system, clarification equipment, flow directing baffle plates, and related hardware which combine to uniquely form a mobile treatment facility.

The mobile decontamination tank is trucked to the contamination site and positioned for connection of the inlet and outlet ports. Bacteria, nutrients, and emulsifiers are added in the proper proportion and processing begins. When the decontamination is concluded, the decontamination unit can be quickly shut down and relocated where needed.

DESCRIPTION OF THE PREFERRED EMBODIMENT

Figure 1:
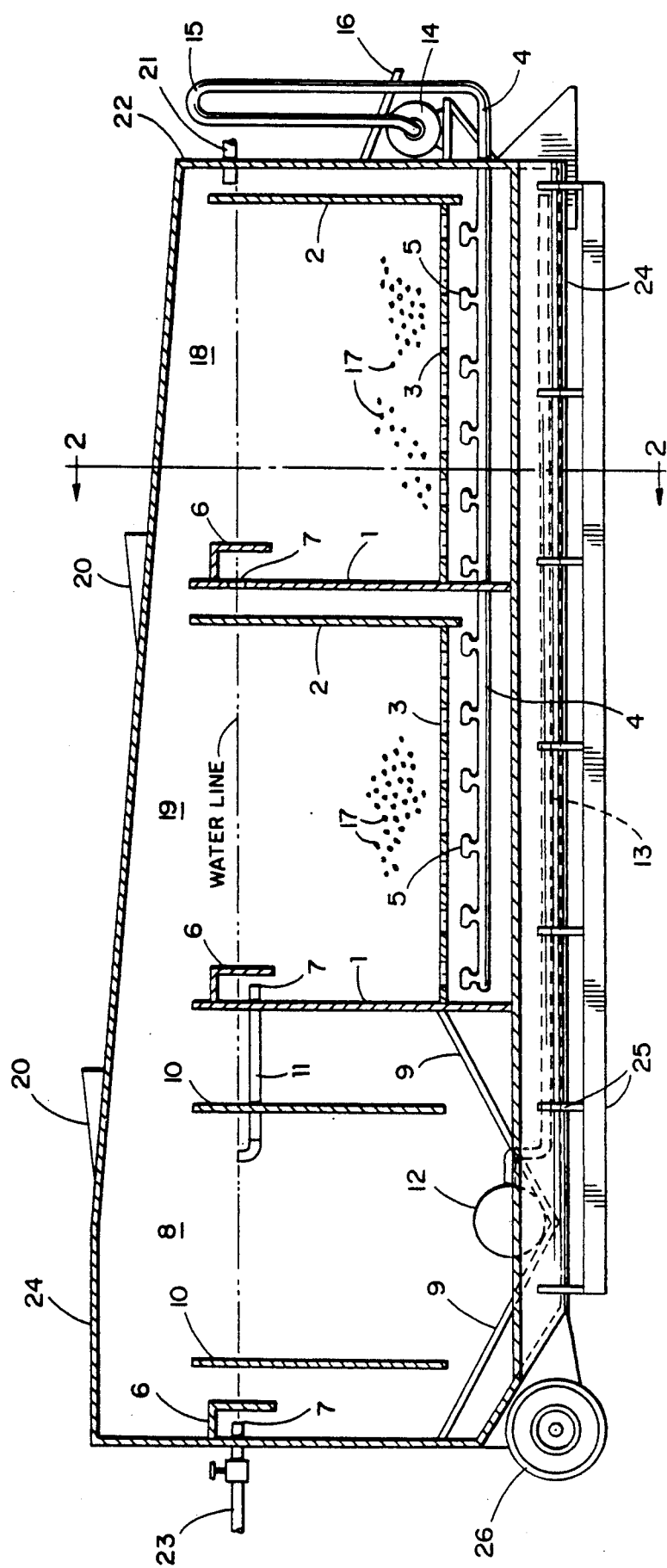
FIG. 1 is a longitudinal sectional view of the mobile decontamination apparatus taken along section line 1—1 on FIG. 2.
Figure 3:
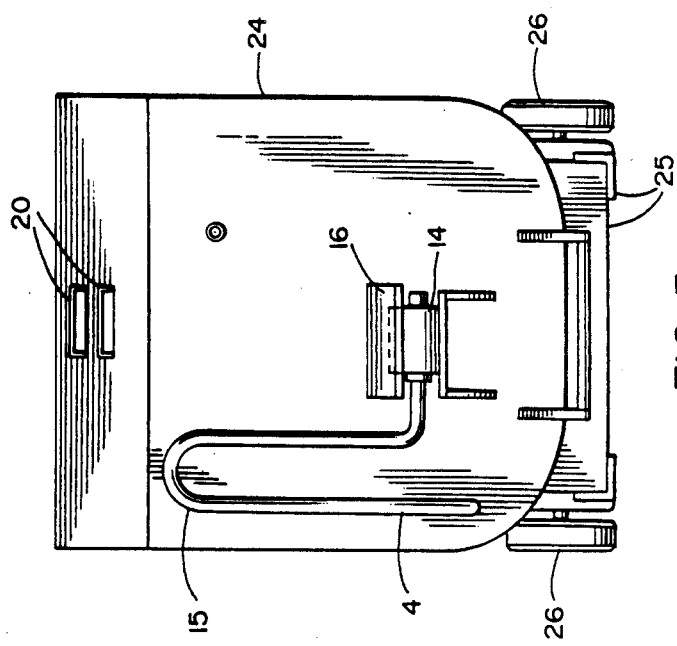
FIG. 3 is an end elevational view of the front of the mobile decontamination apparatus.
Figure 5:
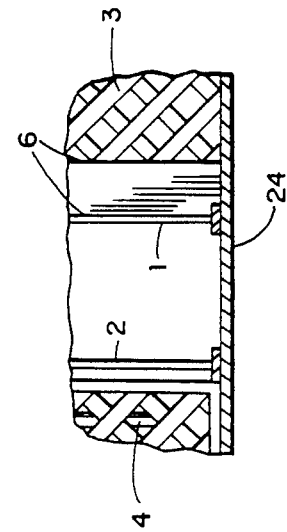
FIG. 5 is an enlarged, fragmental sectional view taken along section line 5—5 on FIG. 2, showing a trash block, dividing baffle, and directional baffle.
Figure 2:
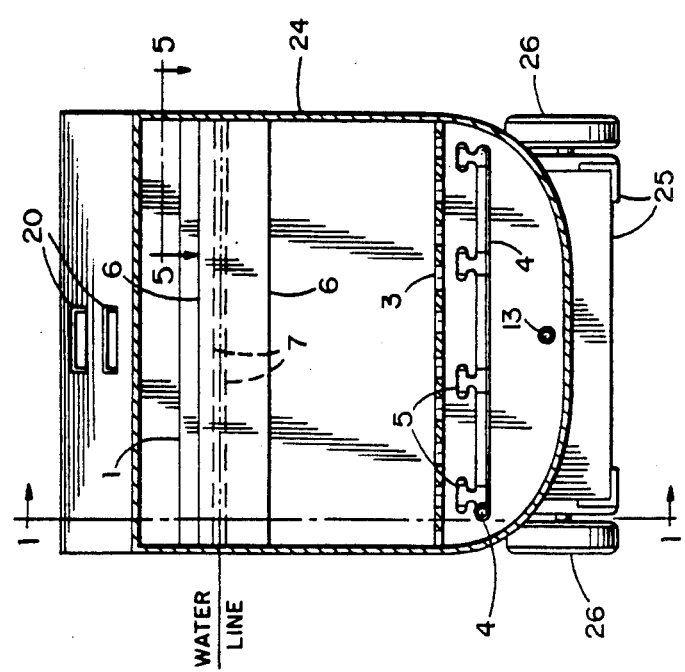
FIG. 2 is a transverse sectional view of the mobile decontamination apparatus taken along section line 2—2 on FIG. 1.
Figure 4:
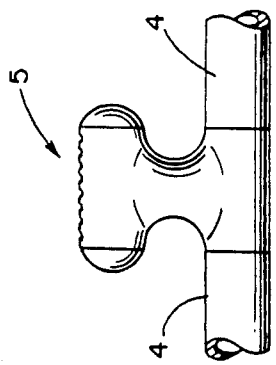
FIG. 4 is an enlarged side elevational view of a section of the air manifold and air sparger system.

As best seen on FIGS. 1, 2, and 3, the present invention generally comprises a conventional oil field fractionation tank 24 supported by skid beams 25 and wheel/axle assembly 26. Divider baffles 1 separate tank 24 into treatment cells 18 and 19 and clarifier cell 8. Air is supplied to treatment cells 18 and 19, below catwalk-type floor 3, from blower 14 through backflow trap 15, manifold 4 and air spargers 5. Blower 14 is protected by weather shield 16. Trash blocks 6 restrict the flow of surface debris and oils through ports 7 while directional baffles 2 direct the flow of water within treatment cells 18 and 19.

Located within clarifier cell 8 are focus slide plates 9, stilling plates 10, entry pipe 11, and recycling pump 12 which, in turn, is connected to recycling pipe 13. Inlet port 21 and outlet port 23 are fitted to the front and rear bulkheads of tank 24 respectively.

When the treatment unit is delivered to the treatment site, industrial waste water or contaminated ground water enter tank 24, dropping down between front bulkhead 22 of tank 24 and front directional baffle 2. The water then flows up through floor 3 into primary treatment cell 18. Flow rates, which can be monitored by an external flow meter (not shown) are adjusted to maintain a water level within tank 24 above ports 7 and below the top level of trash blocks 6. Synthetic biomedia 17 in the form of activated bacteria is added to the synthetic biomedia 17 in cells 18 and 19, in accordance with the biodegradation process more particularly described in U.S. Pat. No. 4,584,102.

Hence, the organic, contaminated ground water is passed by the bacteria, which then acts as a bacterial filter, removing and metabolizing organics and converting them basically to carbon dioxide and more bacteria. The air needed for bacterial respiration is generated by high volume blower 14, passes through manifold 4, out the air spargers 5, and is then dispersed upward through biomedia 17. From primary treatment cell 18 the water then flows under trash block 6, is passed through port 7 between flow direction baffle plate 2 and divider baffle 1, and downward again for entry into secondary treatment cell 19. Then the water, from the bottom to the top, in an upflow manner, again circulates through the synthetic biomedia 17 (which has had acclimated biomass cultivated and attached to it), and is constantly aerated from air spargers 5 which are attached to manifold 4 which is attached to blower 14.

After passing through treatment in secondary treatment cell 19, the treated water passes under trash block 6 into clarifier cell 8, and the water flow rate is then stilled between stilling plates 10. Any bacteria which have become dislodged in primary treatment cell 18 or secondary treatment cell 19 are then allowed to settle to the bottom of clarifier 8, coming along focus slide plates 9 into recycle pump 12. This recycle pump, from time to time, pumps the activated biomass, or bacteria, along recycle pipe 13 back into primary treatment cell 18. Treated water then exits rear exit port 23.

Flow rates through the decontamination unit depends upon two things: (1) the BOD loading, or the organic makeup of the waste water, and (2) hydraulic loading, or gallons of fluid per minute processed through the system. These two systems are usually inversely proportionate to each other. This means that the lower the organic loading, the faster or higher the hydraulic loading, and vice versa. The higher the hydraulic loading, the lower the organic loading can be. Also, in the operation of this unit it may become necessary to use a mixing tank or an equalization tank which also has surge capabilities for any pretreatment, such as pH adjustment, or co-metabolite additions that may be required before the waste stream is suitable for biotreatment. Of course, this is just prelocated in series to the biotreater. Also, in the case of certain volatiles or carcinogenic materials that may air strip, carbon vents may be put under hatchways 20 to prevent any volatile or carcinogenic air stripping. Also, in addition to this, various external valves and flow meters may be attached to the unit for various dispersion of incoming and outgoing waste stream. For an example of treatment levels and hydraulic and BOD loadings, please note the following chart.

| Hydraulic Loading = 20 gallons per minute (pgm) | | |
| --- | --- | --- |
| BOD Loadings | After Treatment | Before Treatment |
| Benzo(a) anthracene | ND* | ND |
| Benzene | ND | ND |
| Benzo(b) bluorathene | ND | ND |
| Chrysene | ND | ND |
| Total cresols | 0.035 | ND |
| 2,4-Dichlorophenol | 0.150 | ND |
| Fluoranthene | ND | ND |
| Napthalene | 2.850 | ND |
| Pentachlorophenol | 4.880 | 0.099 |
| Phenol | ND | ND |
| Toluene | 0.032 | ND |

*Non-detectable

Upon determining the optimum processing parameters for a particular waste stream, the present invention can be operated n a continuous or semi-continuous manner. Moreover, the decontamination units can be used individually, or several decontamination units can be used jointly, depending upon volume requirements. Thus, the decontamination units may be used in a series or in parallel, depending on the overall treatment scheme required and the individual site and space characteristics.

As will be readily understood by those of ordinary skill in the art, minor modifications may be made in the invention described without in any way departing from the spirit and scope of the invention.

What I claim is:

1. An apparatus for treatment of industrial, organically-contaminated water supplies using a method of bacterial biodegradation comprising a longitudinally elongated, horizontally disposed tank including end bulkheads, at least two divider baffles oriented vertically and in spaced relation to each other and the bulkheads, each divider baffle being joined with the periphery of the tank to divide the interior of the tank into a primary treatment cell, a secondary treatment and a clarifier cell, said cells being arranged in tandem relation, an inlet for contaminated water in one end bulkhead for supplying contaminated water to the primary treatment cell, said inlet being located adjacent the top of but spaced below the top of the primary treatment cell, an outlet for treated water in the other end bulkhead for discharging treated water from the clarifier cell, said outlet being disposed at the same elevation as the inlet, a plurality of air spargers located in the bottom portion of each of the treatment cells, blower means communicated with said air spargers for discharging air into the bottom portion of each of said treatment cells, each of said divider baffles having a port at the same elevation as the inlet and outlet for communicating said cells, a vertically disposed directional baffle disposed adjacent to but spaced from the end bulkhead having the inlet therein with the upper end disposed above the inlet and the lower end disposed above the bottom of the tank thereby directing flow from incoming contaminated water downwardly toward the bottom of the primary treatment cell for passage below the lower end of the directional baffle, a vertically disposed directional baffle located in the secondary treatment cell and disposed adjacent to but in spaced relation to the divider baffle between the primary and secondary treatment cells with the upper end thereof disposed above the port in the divider baffle and the lower end disposed above the bottom of the tank thereby directing flow from the primary treatment cell into the secondary treatment cell downwardly under the lower end of the directional baffle, a pair of vertically disposed stilling plates in said clarifier cell, said stilling plates being spaced from each other and spaced from the divider baffle defining the secondary treatment cell and the bulkhead having the outlet therein with the upper end of the stilling plates extending above the ports and the lower end disposed above the bottom of the tank for directing flow through the clarifier cell, each of said divider baffles including a trash block in the form of a plate spaced from the port on the upstream side thereof and extending above and below the port to block flow of surface debris through the ports, said bulkhead having the outlet therein including a trash block in the form of a plate spaced from the outlet and extending above and below the outlet to block flow of surface debris from the outlet, each of said treatment cells including synthetic biomedia in the form of activated bacteria added thereto, and means communicating with the bottom portion of the clarifier cell and the primary treatment cell to return activated bacteria from the clarifier cell to the primary treatment cell.

2. The structure as defined in claim 1 wherein said means returning activated bacteria includes a pair of inclined slide plates forming the bottom of said clarifier cell, a pump communicating with the area of the clarifier cell defined by the lower ends of the inclined plates, a recycle pipe extending from the pump to the bottom of the primary treatment cell at a point adjacent the end bulkhead having the inlet therein.

3. The structure as defined in claim 2 wherein said tank is provided with skid beam and a wheel/axle assembly to enable the apparatus to be moved over the road to a treatment site by towing.

* * * * *

UNITED STATES PATENT AND TRADEMARK OFFICE
CERTIFICATE OF CORRECTION

PATENT NO. : 4,999,103

DATED : March 12, 1991

INVENTOR(S) : John D. Bogart

It is certified that error appears in the above-identified patent and that said Letters Patent is hereby corrected as shown below:

On the title page and Col 1, lines 1-5.
Change the title to --MOBILE WATER DECONTAMINATION APPARATUS--.

Signed and Sealed this

Twenty-fourth Day of November, 1992

Attest:

DOUGLAS B. COMER

*Attesting Officer* — *Acting Commissioner of Patents and Trademarks*